Figure 1:
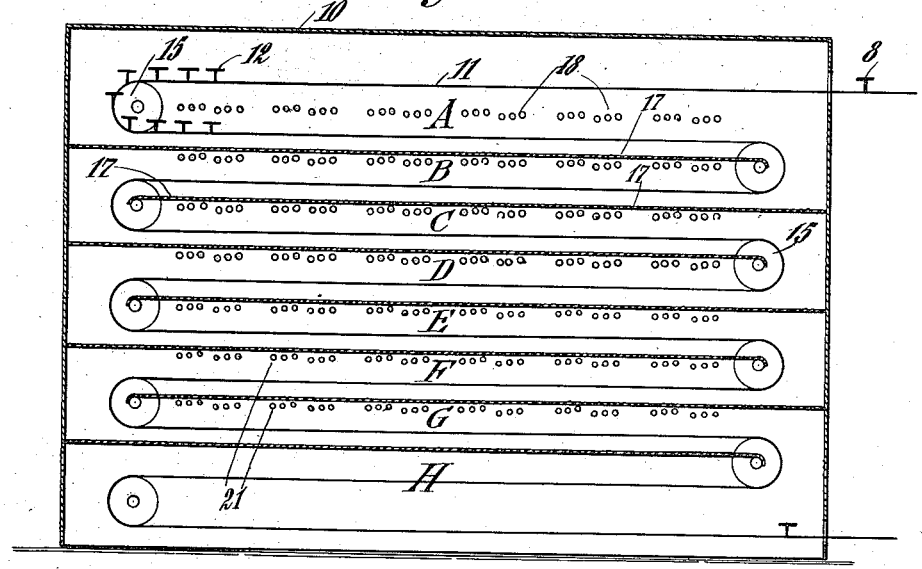

March 25, 1924.

H. A. HOUSE

BAKING PROCESS

Original Filed May 20, 1918

1,488,252

INVENTOR
Henry A. House
BY Earl P. Chespel
ATTORNEY

Patented Mar. 25, 1924.

1,488,252

UNITED STATES PATENT OFFICE.

HENRY A. HOUSE, OF BRIDGEPORT, CONNECTICUT.

BAKING PROCESS.

Application filed May 20, 1918, Serial No. 235,538. Renewed November 17, 1923.

*To all whom it may concern:*

Be it known that I, HENRY A. HOUSE, a citizen of the United States, and resident of Bridgeport, in the county of Fairfield and State of Connecticut, have invented certain new and useful Improvements in Baking Processes, of which the following is a specification.

The present invention relates to an improved process of baking, and has particular application to the baking of biscuits, bread, rolls or the like, when baked in large quantities, and an object of the invention is to provide an improved process whereby the product treated in accordance with the process is caused to be uniformly perfect.

Heretofore, great difficulties have been encountered in the baking of biscuits, rolls, bread and the like, in that on the one hand, the articles were not thoroughly baked, particularly, in their interior portions, and on the other hand, in that, where in certain spasmodic instances some of the products were reasonably perfect in their completed bakings, the larger number were not completely baked, so that such baking in large quantities fell short of complying with the requirements that the product should be uniform.

Another object of this invention is to economize in the cost of the baking by so manipulating the baking process that certain products of the baking process may be recovered and utilized as valuable by-products.

A further object is to bring about the baking of a product in one continuous operation from its beginning to its final cooling, so that the product when it is completely treated will not alone be thoroughly baked, but will also be cooled to approximately the temperature of the atmosphere.

In one embodiment of my process, I convey the product to be baked through a series of chambers, in which suitable temperatures and atmospheric conditions are maintained, until the product is baked, then I subject the baked product to highly heated air, whereby free moisture and the gases resulting from the baking and which are contained in the products are exhausted from them, and thereafter I subject the baked and so-treated products to a cooling treatment. This exhaustion or extraction of the gases prevents the condensation of the gases within the products, as is the case today, and removes them permanently from the products. If desired, these gases may be utilized as a by-product after suitable condensation and subsequent treatment, which treatment forms no part of this invention. At the same time, products treated in accordance with my process lose none of their nutritious ingredients, but on the contrary, have been found to be especially hygienic, nutritious and satisfactory.

In the utilization of my process, I use a certain apparatus, an embodiment of which apparatus I show in the accompanying drawings in diagrammatic form. The process will be described more fully hereinafter, and the invention will be finally pointed out in the claims.

Figure 2:
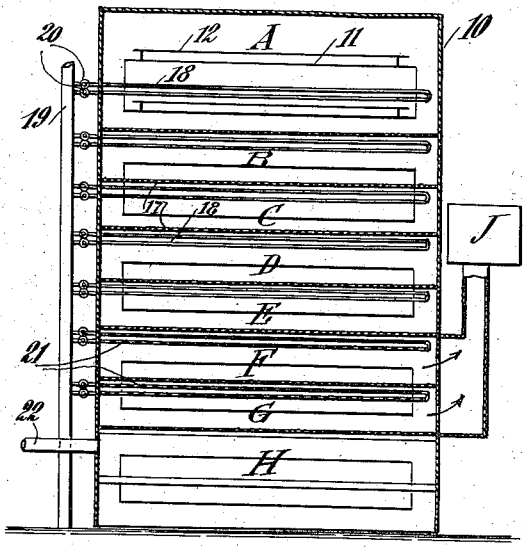

Figure 1 of the drawings is a view of the apparatus in vertical longitudinal section; Figure 2 is a view in vertical transverse section.

After the materials used in the preparation of the dough are suitably mixed in manners well known and formed into the shape of the intended products, as, for instance, in loaf shape for bread, or roll shape for rolls, or biscuit shape for biscuits, I place them upon a conveyer and cause them to pass with the conveyer successively through a series of chambers.

In the accompanying drawings, I place the dough on the conveyor at the place indicated by 8, and the movement of the conveyor causes the dough to be moved into and through the chamber A, which chamber is uppermost in an oven chamber indicated by 10. The chamber A is provided with a series of pipes 18 which are closed and which receive at one end a heating medium, such as heated air. The heating medium is caused to circulate in these separate sets of pipes, and is then emitted from the other ends of the pipes. These pipes 18 are connected with a suitable supply pipe 19 arranged vertically of the oven 10, and the temperature of the pipes is suitably regulated and controlled by thermostatic valves indicated, for instance, by 20 in Figure 2. None of the air that passes through the pipes 18 enters into the chamber A, the air in chamber A being simply that which is contained therein, but this air in chamber A is heated to a temperature of about 250° to 300° F. by the pipes 18. Consequently the products 12 on the conveyer 11 are subjected to a preliminary baking action in passing through the chamber A. The products 12 in passing through the chamber A are preferably subjected to the direct influence of the heat from the pipes 18 alternately on opposite sides of the articles. In the present instance the products in their first passage through the chamber A, are subjected to the direct influence of the heat from the pipes 18 on their undersides. Then the articles are caused to traverse the chamber A for a second time during which they are subjected to the direct influence of the heat from the pipes 18 on their upper sides. In their second traverse through the chamber A the products are brought into closer proximity to the pipes 18 than during their first traverse so that they are subjected to a somewhat greater baking heat than during their first traverse through the chamber.

When the products 12 arrive at the end of the chamber A where the conveyer 11 passes over the wheel 15, they enter the next lowermost chamber B, which is provided with heating pipes similar to those indicated by 18 in chamber A. The pipes in chamber B, however, are heated to a greater degree than those in chamber A, so that the air in chamber B reaches about 300° to 350°, and by this the products 12 are given a successive baking action of gradually warmer character. Thereupon the products pass through the chamber B until they enter the next lowermost chamber C, which is again provided with heating pipes similar to the pipes 18, but here again the temperature is increased so that the temperature of the air in chamber C is about 350° to 400°, whereby a still stronger baking action is obtained.

Thereafter the products leaving chamber C enter chamber D, which is immediately below the chamber C and in which heating pipes similar to the pipes 18 are also arranged. The heating medium has its temperature further increased, in the chamber D, so that the temperature in chamber D is about 450°; that is, between 400 and 500 degrees F., a temperature of about 400 to 450 degrees F. being the preferred temperature for certain products, as, for instance, wheat biscuits.

The heating in chamber D subjects the products to be baked to the final baking action. It will be noted that the products in traversing the chambers A, B, C, D, pass through baking zones of successively higher temperatures. That is, from the time of the preliminary baking in chamber A to the final baking in chamber D, the temperatures are uniformly increased until the final baking takes place.

The uniformity of the baking action is enhanced by the arrangement of the chambers A, B, C and D and the path of travel of the products through them, in that in the passage of the products successively from the baking zones of lower temperature to those of higher temperature, opposite lateral sides of the products are alternately first subjected to the increased heat. In other words, in passing from the first baking zone in chamber A to the second baking zone in chamber B, the left-hand sides of the products are first subjected to the increased heat in chamber B, whereas in passing from the second baking zone in chamber B to the third baking zone in chamber C, the right-hand sides of the products are first exposed to the increased heat in chamber C. In this manner the effect of the increased heat in the various baking zones is equalized on all parts of the articles.

The products having been completely baked they are then passed into the next lowermost chamber E, where the temperature is about 300°, and in which they retain about the baking temperature. The hot air is absorbed by the articles. The evaporation has a tendency to drive out steam, but is not hot enough to continue baking, but is hot enough to dry. In chamber E, heating pipes as in chamber A are provided.

Then the products pass into the next lowermost chambers F and G. In these chambers F and G the pipes which are similar to those of chambers A to E in shape and arrangement, are, however, provided with perforations 21 to enable air in the pipes to pass out of the same and to enter the chambers F and G. This air is dry air and preferably highly heated, and, as a result, it absorbs the moisture in the biscuits as the moisture in the biscuits will have an affinity for the dry air up to the point of saturation of the air. The temperature of the heated air is about 900° and this high temperature thoroughly vaporizes the moisture in the biscuits. But the air is so conditioned and the inflow is so regulated that before saturation of the air, that is, just prior thereto, the air will escape from the chambers E and F and be conducted away from the oven into a collector J, precipitating the moisture and such gases as are exhausted or extracted from the biscuits. It is well known that during the baking process, especially during the particular process just described, in which the biscuits are subjected to the gradual increase of temperatures, the action of the highest baking heat will cause certain gases to be formed and these will be contained within the products, either the loaf or the biscuits or the rolls, as the case may be.

Now, in ordinary processes of baking, these gases and some moisture contained within the harder outer shell of the products will, when the products are removed from the oven and allowed to cool, condense within the products and it has been stated by some that this has a deteriorating influence upon the character of the final product.

At any rate, it is believed that the presence of these gases has an unfavorable influence upon the completeness of the baking action, since they would resist the action of the heat in its passage toward the interior of the products. But, by subjecting the products after they have been successively treated by gradual increases of temperatures until the final baking temperature is reached, to the action of dry and heated air circulating through the chambers through which these baking products pass, these gases will be extracted from or exhausted from the products. As a result of this, the heat within the products can carry out the baking of the products to completion, namely, to the baking of the most inner parts of the products. It is to be noted that the products after the primary baking operation and their passage through the chambers A, B, C, D and E, are subjected to the final baking heat of relatively high temperature during their passage through chambers F and G for a relatively short period of time. The moisture exuded from the products during the primary baking thereof and which is driven off by the direct emission of heat into the chambers F and G prevents charring of the products through their passage through the latter chambers. If desired, instead of using highly heated air in the chambers F and G, I may employ dry superheated steam for the purpose of driving off the moisture and vapors into the collecting chamber J.

As stated, the moisture and other gases exhausted or extracted from the biscuits are conducted to a separate collector, where they may be treated in accordance with certain methods, one method being, for instance, the obtaining of alcohol. These methods however, form no part of this process, and, therefore, are not further described, it being sufficient for the description of the process to state that by this step of subjecting the baked products to the heated dry air, the moisture and gases are removed, and that the exhausted gases may be converted into useful by-products.

The products are then, in their movement on the conveyer, carried through the end of the chamber G and enter into the lowermost chamber H, which is suitably cooled by pipes 22 having a cooling medium therein, or suitably cooled by having this chamber connected with the atmospheric air. The object of this cooling is to have the products gradually take the temperature of the atmosphere, and the preferable way is to have this chamber filled with cooled dry air so that the cooling may be carried out, in a manner so as to prevent any absorption of moisture by the baked products until the products are entirely cooled.

When these products are entirely cooled, they may be taken out of the cooling chamber, that is, out of the oven 10, and when they are then exposed to the influence of the atmosphere, they will not absorb any moisture. The baked products with moisture and other gases extracted, having been completely baked and finally cooled to prevent re-absorption of moisture, are then ready for the market, and may be, by suitable hand or machine operated packing devices, suitably packed into cartons, for shipment.

I have found that by the application of my process to dough in the form of wheat biscuits, not alone are the exteriors of the biscuits given a thorough and satisfactory baking, but also the interiors thereof are thoroughly baked, and I have found upon breaking up such biscuits that all parts thereof are thoroughly and uniformly baked, which has not been the case heretofore with any known methods or apparatus.

By the arrangement of various chambers in one containing oven, a self-contained apparatus is provided which is entirely automatic, and whereby my process may be automatically carried out from the beginning of such baking to its final baking.

Of course, the apparatus may be varied. For example, instead of arranging the chambers in vertical layers superimposed one on the other, they may be arranged longitudinally of each other without departing from important features of the invention, and the products to be treated may be passed through these longitudinally arranged chambers, a particularly important feature of the process is the subjection of the dough to successively higher temperatures up to the baking temperature, and then subjecting the baked products to a dry and heated current of air to extract moisture and gases from the products to enable thorough baking of all parts thereof to be effected.

Having thus described my invention, I desire to secure by Letters Patent:

1. An improved baking process which consists in continuously moving the products to be baked, through a plurality of baking zones successively increasing in temperature, and thereafter subjecting the products to a relatively high temperature and for a comparatively short period of time to drive off the moisture.

2. An improved baking process which consists in continuously moving the products to be baked, through a plurality of baking zones successively increasing in temperature, and thereafter subjecting the products to a relatively high temperature and for a comparatively short period of time to drive off the moisture, and finally subjecting the products to an induced current of cool air to reduce the temperature thereof to that of the atmosphere.

3. An improved baking process which consists in continuously and progressively moving the products to be baked through a plurality of baking zones heated by conduction and successively increasing in temperature, and thereafter subjecting the products to the action of a direct heat of relatively high temperature to drive off the gases generated during baking.

4. An improved baking process which consists in continuously and progressively moving products to be baked through a plurality of baking zones, then subjecting the products to the action of a direct heat of relatively high temperature, and finally subjecting the products to an induced current of cool air to reduce the temperature thereof to that of the atmosphere.

5. An improved baking process which consists in first moving products continuously through a baking atmosphere, then subjecting the products to the action of a direct heat at a relatively high temperature to drive off the gases generated during the baking operation and finally subjecting the products to the action of a cooling agent to reduce the temperature thereof to that of the atmosphere.

6. In the art of baking, that step which consists in initially subjecting the articles to be baked to the influence of a baking atmosphere in a baking zone, causing said articles to traverse the baking zone for a plurality of times, and then moving the articles successively through other baking zones of gradually increasing temperatures.

7. In the art of baking, that step which consists in initially subjecting the articles to be baked to the influence of a baking atmosphere and uninterruptedly moving the articles through said atmosphere, and during such movement subjecting the opposite sides of the articles alternately and for considerable lengths of time to the direct influence of the baking heat at its point of initial admission into said atmosphere.

8. In the art of baking, that step which consists in uninterruptedly moving the articles to be baked through baking zones of gradually increasing temperatures and subjecting the articles to the relatively low temperature in the initial zone for a period of time longer than that during which they are subjected to the temperature of other of said zones.

9. In the art of baking, that step which consists in uninterruptedly moving the articles to be baked through baking zones of gradually increasing temperatures, subjecting the articles to the relatively low temperature in the initial zone for a period of time longer than that during which they are subjected to the temperature of other of said zones, and during the course of the uninterrupted movement of the articles subjecting the opposite sides of said articles through the initial zone alternately to the direct influence of the baking heat at its point of initial admission into said zone.

10. An improved baking process, which consists in initially subjecting the articles to be baked to a baking atmosphere, and uninterruptedly moving the articles through said atmosphere while subjecting same to a baking heat of gradually increasing temperature, and subsequently subjecting the articles to a relatively high temperature to drive off the moisture exuded from the articles during the baking operation.

11. An improved baking process which consists in uninterruptedly moving the articles to be baked in a single continuous baking operation through a baking atmosphere of gradually increasing temperature and without subjecting the articles to the influence of external air, then subjecting the articles to a relatively high temperature to drive off the excess moisture, and then finally cooling the baked product.

12. In the art of baking, that step which consists in uninterruptedly moving the articles to be baked through a baking atmosphere without subjecting the articles to the influence of external air, and during the course of such movement of the articles subjecting the opposite sides of the same alternately and for considerable lengths of time to the direct influence of the baking heat at its point of initial admission into said atmosphere.

13. In the art of baking, that step which consists in initially subjecting the articles to be baked to a baking atmosphere and uninterruptedly moving the articles through said atmosphere, and during such movement subjecting limited areas of the articles to the direct influence of the baking heat at the point of initial admission of the heat into said atmosphere and then subjecting other areas of said articles to the direct influence of the baking heat and in closer proximity to the source of heat than were the first-mentioned areas.

14. In the art of baking, that step which consists in uninterruptedly moving the articles to be baked through baking zones of gradually increasing temperature, and subjecting opposite sides of the articles alternately to the first action of the increased heat encountered in the passage of the articles from one zone to another.

15. In the art of baking, first subjecting the articles to be baked to the influence of a baking atmosphere of low temperature, and then successively moving the articles through a series of baking zones increasing progressively in temperature and each exceeding the initial baking temperature, and subjecting the articles to each of the latter baking temperatures for a relatively shorter period of time than they are subjected to the initial baking temperature.

In testimony that I claim the foregoing as my invention, I have signed my name.

HENRY A. HOUSE.